April 19, 1927.　　　　　N. H. RICKER　　　　　1,625,625
SEISMOGRAPH
Filed Dec. 11, 1924　　　2 Sheets-Sheet 1
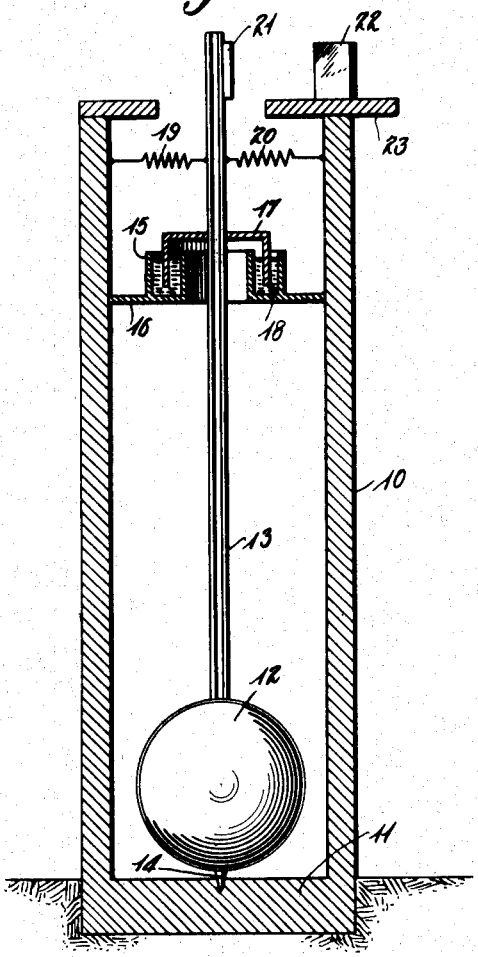
Fig. 1.
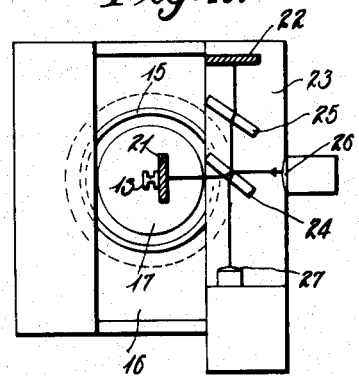
Fig. 2.
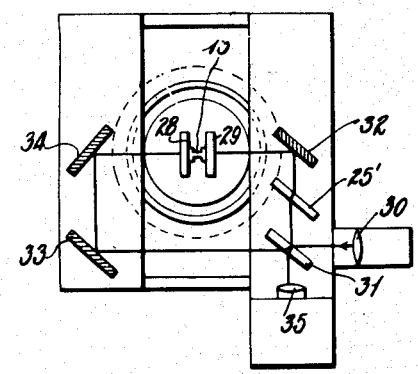
Fig. 3.
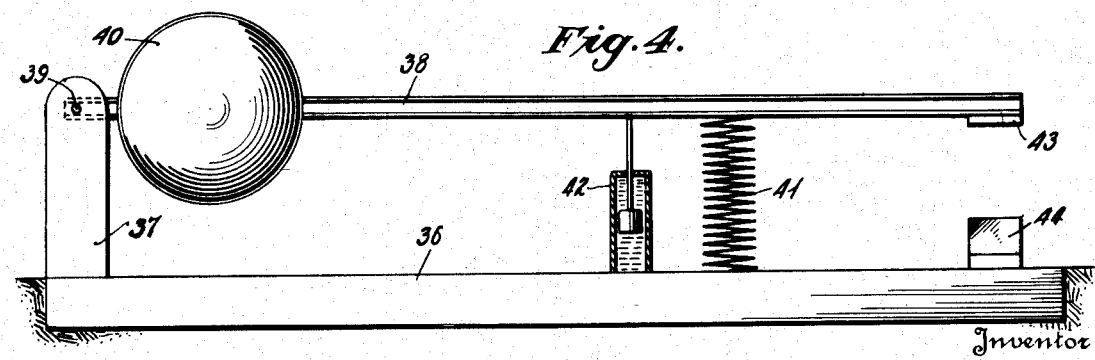
Fig. 4.
Fig. 7.
Inventor
Norman H. Ricker
By Brown & Phelps
Attorneys April 19, 1927.

N. H. RICKER

SEISMOGRAPH

Filed Dec. 11, 1924

Inventor
Norman H. Ricker

By Brown & Phelps
Attorneys

Patented Apr. 19, 1927.

1,625,625

UNITED STATES PATENT OFFICE.

NORMAN H. RICKER, OF HOUSTON, TEXAS, ASSIGNOR TO HUMBLE OIL AND REFINING COMPANY, OF HOUSTON, TEXAS, A CORPORATION OF TEXAS.

SEISMOGRAPH.

Application filed December 11, 1924. Serial No. 755,290.

The invention relates to interferometer equipped seismographs, and has as an object the provision of a seismograph equipped with exceedingly sensitive means for observing deflections of the instrument.

A further object of the invention is the provision of an automatic recording device to record the minute deflections indicated by the interferometer.

A further object of the invention is the provision of a mechanically driven recording device for recording the displacement of interferometer fringes, and for indicating the duration of such displacements.

A further object of the invention is the provision of a seismograph equipped with an interferometer, thus making possible the reading of very minute movements of the seismograph, and making possible its use in determining the form, location, character and structure of underground geological formations.

A further object of the invention is the provision of a much simpler and more rugged seismograph to be used which simplifies operation in the field.

A further object of the invention is the provision of a seismograph equipped for the use of an interferometer with monochromatic light which provides a device which will record both small and large displacements.

Further objects of the invention will appear from the following description when read in connection with the accompanying drawing, wherein Fig. 1 is a central vertical section partly in elevation of a form of seismograph;

Fig. 2 is a plan view partly in section showing the interferometer diagrammatically;

Fig. 3 is a like view of a modified form;

Fig. 4 is a side elevation of a horizontal form of seismograph;

Fig. 7 is a detail sectional view showing a modified form of damping device.

Figures 5, 6:
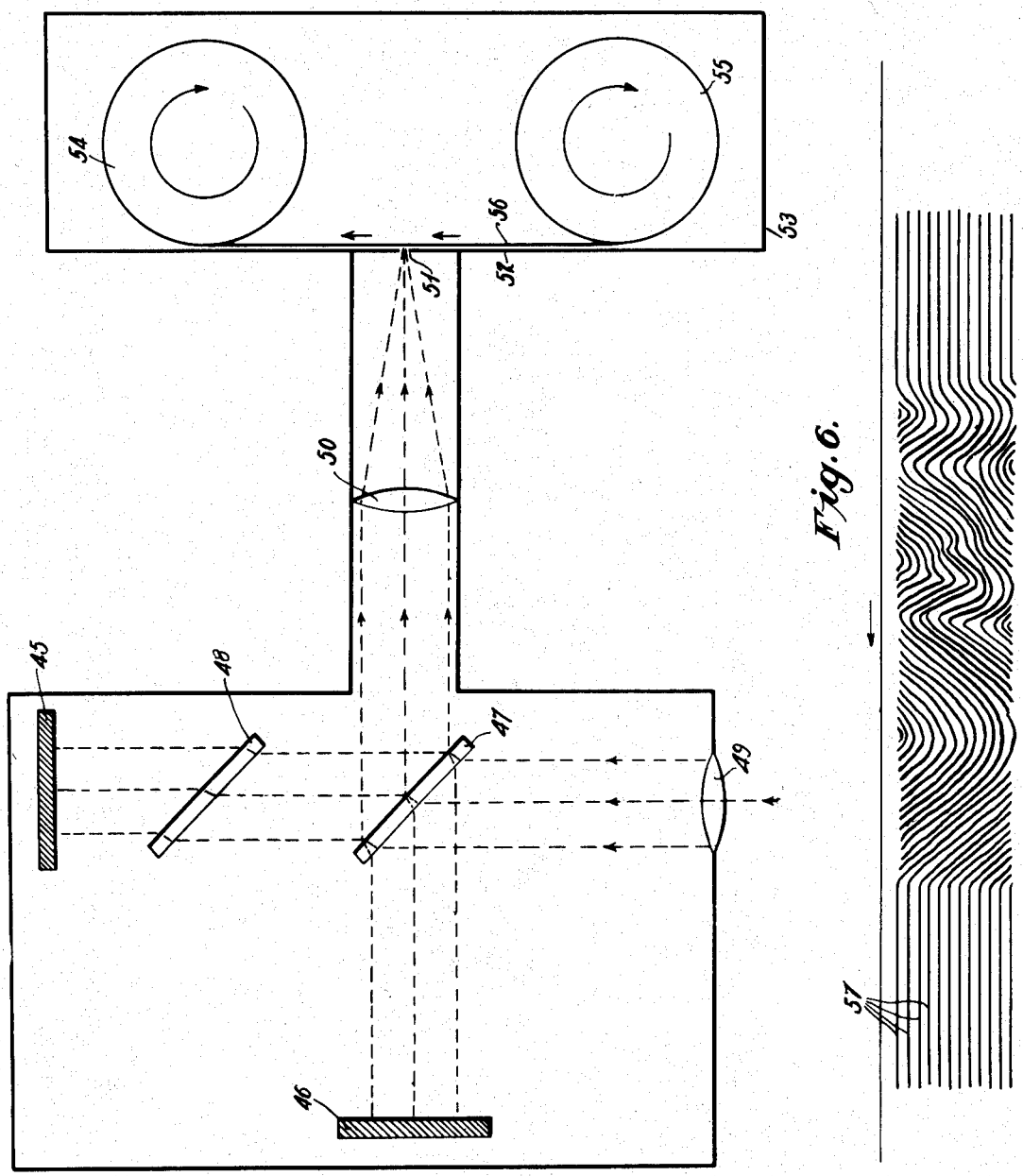
Fig. 5 is a diagrammatic view of a seismograph equipped with an automatic recording device.
Fig. 6 is a view of a section of the record produced by the device of Fig. 5.

As shown in Fig. 1, the seismograph comprises a casing 10 having a base 11. A sphere 12 of large mass is shown mounted upon an upright 13 and provided with a pivot 14, seating in a depression in the base 11. To dampen the vibrations of the arm 13, there is shown an annular receptacle 15 mounted upon a diaphragm 16 and an inverted cup 17 mounted upon the arm 13 and dipping into a viscous liquid 18, as oil or glycerine.

To retain the arm 13 normally in a central position there are shown springs 19, 20 secured to the arm and to the casing 10.

To equip the device for reading of minute movements of the arm 13 an interferometer is shown in the form of a mirror 21, mounted on the arm 13, and a second mirror 22 at right angles thereto mounted upon the support 23, carried by the casing 10. A piece of plate glass 24 or other transparent material, having one face slightly silvered, is shown mounted upon the support 23 and placed at an angle of 45° to each of the mirrors 21, 22. The distance of the mirrors 21, 22 from the member 24 differs by even units of the length of the waves of light to be utilized. A piece of plate glass 25, or other transparent material, is carried by the support 23 parallel to the member 24 to provide a similar path for light to and from the mirror 22, as to the mirror 21.

A source of light 26 is provided and an observing device 27, such as a telescope having a scale therein, not shown. Normally, when the arm 13 is in its central position, light from the source 26 will be divided at the member 24, a portion thereof being reflected to the mirror 22, and a portion being allowed to pass directly to the mirror 21. From the respective mirrors the light will be returned on its own path to the member 24 where a portion of the light from mirror 22 will pass straight through, and that from 21 will be reflected so that the light from the two different paths will pass to the observing instrument 27. The paths traversed by the two portions of the light varying by an even number of wave lengths will produce a normal interference pattern in the observing instrument. If monochromatic light be utilized there will appear alternating lines of greater and less luminosity. If the arm be moved from its central position the interference pattern will be displaced in the telescope and the amount of the deflection of the seismograph may thus be noted upon the scale in terms of light wave lengths.

In the form of Fig. 3, two mirrors 28 and 29 are shown carried by the arm 13, and light from the source 30 is divided by the member 31, and a portion thereof is reflected by the mirror 32 to the mirror 29, the other portion being reflected by mirrors 33—34 to the mirror 28. The light from the two mirrors 28, 29 is returned over its paths and is observed by the instrument 35 in the same manner as already described in connection with Fig. 2.

The form of seismograph of Fig. 1 is adapted for detecting lateral vibrations of the surface of the earth or the lateral component of vibrations at an angle to the surface.

In Fig. 4 is shown a form of instrument for observing vertical displacements or the vertical component of displacement of the crust of the earth. As there shown, the device comprises a base 36 carrying an upright 37 having the end of an arm 38 pivoted thereto at 39. A sphere of considerable mass 40 is shown mounted upon the arm, closely adjacent to the pivot 39, and the arm may be held in normal position by means of a spring 41. A damping device is shown at 42. This form of the device is shown as equipped with mirrors 43, 44, to form a portion of an interferometer in the manner already described.

A magnetic damping device is shown in Fig. 7, in which a metal plate, as copper or aluminium is shown at 58, carried by the arm 38. A magnet, shown as a permanent magnet, is indicated at 59 stationarily mounted in position to receive the plate 58 between its poles. Motion of the arm 38 will thus be resisted by Foucault currents set up in the plate 58 to effectually damp the movements of the arm. Obviously the magnet 59 may be an electromagnet if desired.

In Fig. 5 there is diagrammatically shown a form of automatic recording instrument. In this figure, the mirrors 45, 46 may be the mirrors 44, 44 of Fig. 4, or 21, 22 of Fig. 2, as will be evident, and the member 47 corresponds to the member 31 of Fig. 3. The member 48 corresponds to the members 25, 25' of Figs. 2 and 3.

In this form of the device a source of light is diagrammatically indicated at 49, and a lens at 50 to focus the rays of light returned from the mirrors 45, 46 upon a slit 51 in an opaque wall 52, of a casing 53. Within the casing there is provided a pair of spools 54, 55, having wound thereon a strip 56 of sensitized material, as paper or film. A clockwork mechanism, not shown, of some known and suitable form is provided to revolve the spools in the directions indicated by the arrows to thereby pass the strip 56 by the slit 51 at a uniform rate of speed. The relation of the slit 51 to the rays of light will be such that the interference bands will fall at right angles to the slit, so that each band of increased luminosity will fall upon the sensitized material as a point of light. The result of passing the strip past the slit when the arm of the seismograph is motionless in its normal position will be to cause on the sensitized material a series of lines such as shown at 57 in Fig. 6, which lines will be straight as long as the arm is motionless. When the arm of the seismograph is moved the interference bands will be displaced and thereby cause a series of waves of varying character such as shown at the central portion of Fig. 6. The duration of any wave can be measured by the length upon the record, and the magnitude of the displacement of the seismograph can be measured by the amount of displacement of the lines laterally upon the record. The character of the displacement can also be readily noted by the form of the lines upon the record.

The use of the permanent record of Fig. 6 enables the displacement of the seismograph arm to be measured in terms of wave lengths of light since the displacement from one side of the record of any number of lines results in the bringing in upon the opposite side of the record of other lines, and the distance between the lines represents one wave length of light. For this purpose it is necessary to provide a monochromatic source of light. The first displacement to the right in Fig. 6 therefore represents displacement of two wave lengths of light, since two lines have disappeared from the record side at this point, and two new lines have been brought in at the opposite side.

Since new lines are brought in on one side of the record band as lines normally present are displaced from the other side, the instrument is capable of registering very heavy shocks with the same degree of accuracy as very light shocks.

By reason of the exceeding sensitiveness of the observing and measuring device provided by the invention it is possible to explore geological formations by means of the artificial earthquake propagation method. Briefly, the method comprises the causing of artificial earthquakes by means of explosions and noting the character of the tremors at various positions remote from the center of the disturbance. Since the disturbances in the crust of the earth are modified by the character of the geological formations, it is possible by a comparison of a large number of readings to judge as to the nature of the underlying formations. This is particularly assisted by the record provided by the device of Figs. 5 and 6 since a permanent record of each observation is secured which may be studied at leisure by the observer, and the comparison of the results of trials in different positions can be compared both quantitatively and qualitatively.

The device will be used by fastening its bed rigidly to the ground and at a distance of from a quarter to a mile or more to a point at which the explosion is produced. The seismic wave will travel by a number of different paths, which paths will be varied as well as the intensity of the disturbances over each path, by the character of the geological formations.

It is desirable also to use both a vertical and a horizontal instrument for each reading. By a study of a large number of records, it is possible to connect various types of underground formations with the appearance of the record. Great skill may be attained by the observer in the interpreting of the records and experience is a valuable assistance as a guide in such study.

I claim:

1. In a device of the class described, in combination, a seismograph having a member adapted to respond to earth tremors, an interferometer having an operating element thereof carried by said member and a second element otherwise supported, means whereby interference bands are displayed by coaction of said elements, and means for observing the influence of movements of said member upon the interference bands displayed by said interferometer.

2. In a device of the class described, in combination, a seismograph comprising an element adapted to respond to disturbances of the earth's crust, a mirror carried by said element, an interferometer comprising said mirror as one element, a stationary mirror as a second element, a source of light to be reflected by said mirrors, a means to divide light from said source and cause each portion thereof to impinge upon one of said mirrors, means to observe the interference phenomena upon the conjunction of said reflected light, and a single standard carrying the parts named.

3. In a device of the class described, in combination, a seismograph having an arm adapted to respond to disturbances of the earth's crust, an interferometer comprising a mirror carried by said movable arm, a fixed mirror, a source of light, means to divide light from said source and cause each portion thereof to impinge upon one of said mirrors, a strip of light sensitive material, means to cause light reflected from said mirrors to fall upon said strip, means to move said strip at a uniform rate of speed, and a single standard carrying the parts named.

4. An interferometer equipped seismograph comprising, in combination, a seismograph arm carrying a mirror comprising a portion of said interferometer, a fixed mirror also comprising a portion of said interferometer, a source of light, a means to divide light from said source and direct the portions to said mirrors, means to focus light returned by said mirrors into a single beam to provide interference fringe phenomena, a slit located perpendicularly to said fringes, a strip of sensitive material arranged behind said slit, means to move said strip at uniform speed past said slit, and a single standard carrying the parts named.

5. A recording device for interferometers comprising, in combination, means to focus the joined beams of light reflected from interferometer mirrors to provide interference fringe phenomena, a wall having a slit arranged perpendicularly to said fringes, a strip of sensitive material behind said wall, means to move said strip past said slit at a uniform rate of speed, whereby to record motion of a movable mirror of said interferometer in terms of wave lengths of light, and a single standard carrying the parts named.

6. In a device of the class described, a seismograph having an arm adapted to respond to disturbances of the crust of the earth, means to hold said arm in a normal position, means to damp motions of said arm, an interferometer comprising a mirror fixed upon a frame of said seismograph, and a movable mirror carried by said arm, means to produce interference phenomena of light reflected from said mirrors, and means to observe such phenomena.

NORMAN H. RICKER.